(12) United States Patent
Fukutani et al.

(10) Patent No.: US 6,652,821 B1
(45) Date of Patent: Nov. 25, 2003

(54) PURIFICATING AGENT FOR FLUE GAS AND INCINERATED ASH AND PURIFICATING METHOD USING THE SAME

(75) Inventors: Yasuo Fukutani, 252-7 Iba, Notogawa-Cho, Kanzaki-Gun, Shiga 521-1235 (JP); Yoshiyuki Futahashi, Yokaichi (JP); Yukio Wada, Hikone (JP); Eiichiro Nakayama, Hikone (JP); Kikuko Fukutani, Shiga (JP); Masami Kojima, Yokaichi (JP); Kosuke Wada, Hikone (JP); Masayoshi Uchida, Kochi (JP); Shunji Suzuki, Yokkaichi (JP); Naoya Fujii, Suzuka (JP)

(73) Assignee: Yasuo Fukutani, Shiga (JP)

( * ) Notice: Subject to any disclaimer, the term of this patent is extended or adjusted under 35 U.S.C. 154(b) by 0 days.

(21) Appl. No.: 09/673,433

(22) PCT Filed: Feb. 10, 2000

(86) PCT No.: PCT/JP00/00781

§ 371 (c)(1),
(2), (4) Date: Oct. 18, 2000

(87) PCT Pub. No.: WO00/48714

PCT Pub. Date: Aug. 24, 2000

(30) Foreign Application Priority Data

Feb. 18, 1999 (JP) ............................................. 11-039929
Jun. 14, 1999 (JP) ............................................. 11-166506

(51) Int. Cl.$^7$ .................. B01D 47/00; C01B 21/04; C01B 17/02; C09K 3/00
(52) U.S. Cl. ................... 423/210; 252/192; 423/239.1; 423/242.2; 423/242.4; 423/240 R
(58) Field of Search .............................. 423/210, 239.1, 423/242.2, 242.4, 240 R; 252/192

(56) References Cited

U.S. PATENT DOCUMENTS

| 4,885,146 A | * | 12/1989 | Lassmann et al. | .......... 423/235 |
| 5,338,521 A | * | 8/1994 | Quinn et al. | ............. 423/210.5 |
| 5,527,517 A | * | 6/1996 | Bridges et al. | ............. 423/210 |

FOREIGN PATENT DOCUMENTS

| JP | 06142637 A | * | 5/1994 | ............ B09B/3/00 |
| JP | 08098900 A | * | 4/1996 | ............ A62D/3/00 |
| JP | 10033939 A | * | 2/1998 | ............ B01D/53/70 |
| JP | 10244128 A | * | 9/1998 | ............ B01D/53/68 |

* cited by examiner

Primary Examiner—Wayne A. Langel
Assistant Examiner—Jonas N. Strickland
(74) Attorney, Agent, or Firm—Milde & Hoffberg, LLP

(57) ABSTRACT

The present invention provides a purifying agent having an effect of removing or decomposing toxic substances contained in flue gas or incinerated ash. The purifying agent of the present invention contains one or more kinds of salts selected from alkali metal silicates, fluoride ion, hydrogencarbonate ion, and water-soluble alcohols or derivatives thereof.

7 Claims, 1 Drawing Sheet

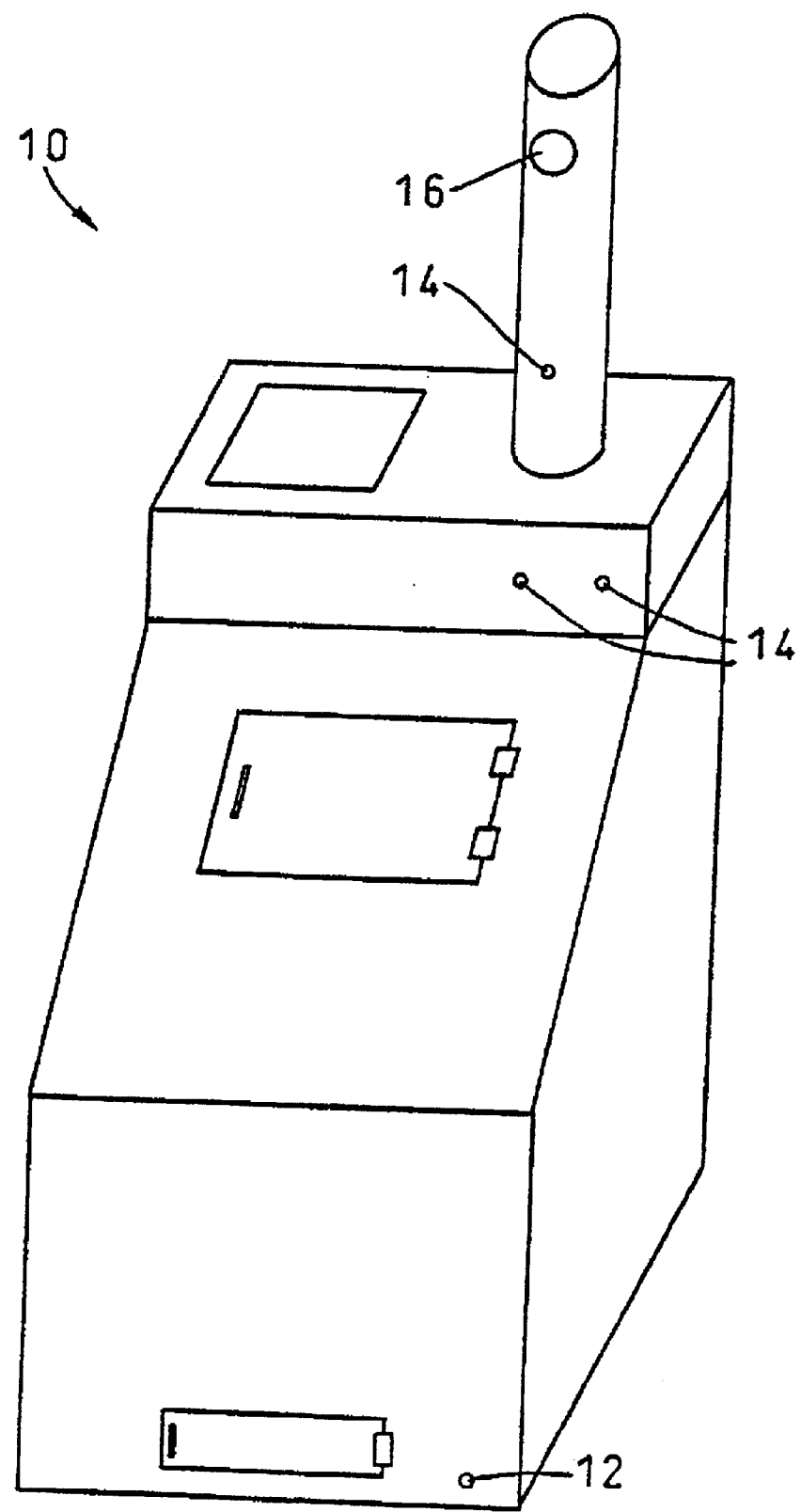

PURIFICATING AGENT FOR FLUE GAS AND INCINERATED ASH AND PURIFICATING METHOD USING THE SAME

FIELD OF THE INVENTION

The present invention relates to an agent and a method for purifying flue gas and incinerated ash. More particularly, the invention relates to an agent and a method for decomposing or removing toxic components from flue gas or incinerated ash in which toxic substances such as dioxins and nitrogen oxides are contained.

BACKGROUND OF THE INVENTION

It has so far been reported that various substances generated by combustion cause air pollution and exert bad effects to living things. For example, nitrogen oxide ($No_x$) is said to be a main culprit in acid rain and photochemical smog, and some respiratory diseases.

In combustion, highly toxic dioxins such as polychlorinated dibenzo-p-dioxins (PCDDs) and polychlorinated dibenzofurans (PCDFs) are evolved. Such dioxins have now become a serious social problem, since they cause chlorine acne, pigmentation, alopecia, hirsutism, liver disorder, miscarriage, pregnancy abnormalities and thus exert immeasurably harmful effects on humans.

It has thus been desired to devise a new method for removing toxic substances such as dioxins and nitrogen oxides from flue gases and incinerated ashes. Various measures are now being tried in various countries to control the emission of nitrogen oxides and to prevent the generation of dioxins.

An example of a conventional method for purifying flue gas containing nitrogen oxides is a catalytic reduction method using ammonia. However, this method requires an intricate apparatus for safely handling ammonia and is quite costly. In addition, where sulfur oxides are contained in the flue gases, compounds such as ammonium hydrogensulfate and ammonium disulfate, which may be a cause of corrosion, are generated and may affect the apparatus.

Another conventional method is a method for adsorbing nitrogen oxides into active carbon fiber. However, in this method, activated carbon fiber has low adsorptive capacity for nitrogen monoxide, so that complete removal of nitrogen oxides is difficult. Still another conventional method is a method for allowing activated carbon fiber to support metal hydroxides and metal oxides so as to increase adsorptive capacity for nitrogen monoxide. However, since active carbon fiber has a limit of adsorptive capacity and simply adsorbs toxic substances, no fundamental solution is derived from this method.

In order to prevent the generation of dioxins, high-temperature incineration or complete incineration of wastes has been studied. However, the construction cost of a combustion facility entails high cost and the complete prevention of dioxins may often be difficult to achieve.

An object of the present invention is to provide an agent for purifying flue gas and incinerated ash, which does not have any above problems.

As a result of intensive studies to achieve an agent for purifying flue gas and incinerated ash, which has excellent purifying capacities and can be safely disposed of after being used, the inventors have attained the present invention.

DISCLOSURE OF THE INVENTION

An agent for purifying flue gas and incinerated ash according to the present invention contains: one or more kinds of salts selected from alkali metal silicates; fluoride ion; hydrogencarbonate ion; and water-soluble alcohols or derivatives thereof.

In the agent according to the present invention, the one or more salts selected from alkali metal silicates can be sodium silicate.

In the agent according to the present invention, the water soluble alcohols or the derivatives thereof can be ethylene glycol.

In a method for purifying flue gas according to the present invention, any one of the above agents is sprayed to the flue gas.

In a method for purifying incinerated ash according to the present invention, any one of the above agents is sprayed to the fly incineration.

BRIEF DESCRIPTION OF THE INVENTION

FIG. 1 is a perspective view of an incinerator in which incineration is carried out while a purifying agent for flue gas according to the present invention is being sprayed.

DESCRIPTION OF THE PREFERRED EMBODIMENTS

A purifying agent for flue gas and incinerated ash according to the present invention contains: one or more kinds of salts selected from alkali metal silicates; fluoride ion; hydrogencarbonate ion; and water soluble alcohols or derivatives thereof.

Alkali metal silicates according to the present invention includes sodium silicate, potassium silicate, lithium silicate, and the like. The agent of the present invention contains one kind or a combination of two or more kinds selected from the above silicates. In the agent for purifying flue gas and incinerated ash according to the present invention, the concentration of alkali metal silicates are not particularly limited, however, preferably 0.1 wt % to 25 wt %. In the present invention, even if the concentration of alkali metal silicates is 0.1 wt % or more to less than 5 wt %, sufficient purifying effects can be exhibited. Where the concentration of alkali metal silicates are less than 0.1 wt %, sufficient purifying effects cannot be exhibited. On the other hand, where the concentration of alkali silicates are 25 wt % or more, an increase of effects beyond a certain level cannot be expected.

Other essential components contained in the purifying agent of the present invention are: fluoride ion, hydrogencarbonate ion, and water soluble alcohols or derivatives thereof. Although the concentrations of fluoride ion and hydrogencarbonate ion are not particularly limited, it is preferable that the concentration of fluoride ion is in a range of $1\times10^{-3}$ wt % to 10 wt %, and the concentration of hydrogencarbonate ion is in a range of $1\times10^{-2}$ wt % to 10 wt %. Preferably usable water soluble alcohols or derivatives thereof include glycerin, ethyl alcohol, methyl alcohol, ethylene glycol or the derivatives thereof. Ethylene glycol or the derivatives thereof are most preferably used. The concentration of ethylene glycol or the derivatives thereof is not particularly limited, but preferably 1 wt % to 20 wt %, more preferably 2 wt % to 10 wt %. If the concentrations of these components are below the above range, sufficient purifying effects can not be exhibited. On the contrary, if the concentrations of these components are over the above range, the viscosity of the agent becomes undesirably high but purifying effects do not increase with the concentration, thus various problems are caused.

The agent for purifying flue gas and incinerated ash according to the present invention can be prepared by dissolving a predetermined amount of sodium silicate, sodium bicarbonate, sodium fluoride, and ethylene glycol in distilled water, tap water, mineral water, or the like, but the preparation of the agent is not limited to the above. Particularly, sodium ion can be replaced with other alkali metal ions or other cations.

The agent for purifying flue gas and incinerated ash according to the present invention can be used as-is, but it may contain other additives. The other additives can be added in accordance with its practical use to the extent that its performance is not impaired. Examples of the additives include thickener, leveling agent, colorant, perfume, and the like.

The agent for purifying flue gas and incinerated ash according to the present invention can be obtained by mixing and dissolving appropriate amount of alkali metal silicate, fluoride ion, hydrogencarbonate ion, and water soluble alcohols or derivatives thereof, or any other components in water or water soluble solvent.

The agent for purifying flue gas and incinerated ash according to the present invention can be sprayed directly to flue gas or incinerated ash generated in combustion to remove toxic substances contained in flue gas and incinerated ash by decomposing and/or adsorbing them. The flue gas used herein means a gas, a mixture of gases and liquids, and/or a mixture of gases and solids, which is/are generated by incinerating wastes, burning gasoline in a car engine or oil in a pump, and the like. The incinerated ash used herein means ash produced by incineration. A method for applying the agent of the present invention to flue gas and incinerated ash is not particularly limited. An example of applicable method is a method for spraying or showering the agent directly to flue gas or incinerated ash by special apparatus. Another applicable method is a method for impregnating a honeycomb-like, ball-like, or film-like support with the agent to allow the flue gas to pass through the support. In this method, the materials of the support are not particularly limited, but any kinds of materials can be used. Examples of the materials of the support are cotton, chemical fiber fabric, resin particle, and plastic.

In incineration of wastes, it is particularly preferable to use an apparatus for spraying the purifying agent.

Generally, flue gas contains toxic substances such as dioxins, dust, sulfur oxides, nitrogen oxides, hydrogen chloride, or dioxin. Incinerated ash contains toxic substances such as dioxins and dibenzofuran. The agent for purifying flue gas and incinerated ash according to the present invention is useful for rendering the gas and the ash harmless by absorbing and decomposing toxic substances contained therein.

Although the amount of the purifying agent applied to flue gas or incinerated ash is not particularly limited, about 100 ml to 40,000 ml of agent containing the above components in the above range of concentration is applied to 100 $m^3$ of flue gas or 1 kg of incinerated ash, and preferably 1,000 ml to 10,000 ml of agent is applied.

Examples of the use of the agent for purifying flue gas according to the present invention will be described below. However, the Examples should not be construed to limit the invention in any way. It will be apparent that various improvements, modifications, and changes can be made to the embodiments on the basis of knowledge of those skilled in the art without departing from the scope of the present invention.

EXAMPLES

Preparation I 3390 g of sodium silicate (Arakawa Chemical Industries, LTD.), 177 g of sodium fluoride (Arakawa Chemical Industries, LTD.), 883 g of hydrogencarbonate sodium (Wako Pure Chemicals Industries, LTD.), and 18 liters of ethylene glycol (Arakawa Chemical Industries, LTD.; a specific gravity of 1.1155) were added to 400 liters of distilled water and dissolved with stirring to prepare the agent for purifying flue gas and incinerated ash.

Examples 1

Using a 6 mm-thick iron board SS400, a furnace 10 shown in FIG. 1 was produced. The furnace 10 is 900 mm in width and 700 mm in length of a bottom surface, and 2100 mm in height including a chimney. On the lower part of the furnace, an opening 12 for air intake is provided. On the upper part of the furnace, mist holes 14 for continuously or discontinuously spraying a proper amount of the purifying agent are formed. The chimney has an opening 16 for analyzing gas. By using this incinerator, the effectiveness of the purifying agent of the present invention was tested. During the test, the air and the purifying agent of the present invention were continuously supplied to the incinerator from the compressor.

30 kg of lubber chips 20 centimeters square made from used tires, 181 kg of used engine oil, 30 kg of vinyl chloride chips, 30 kg of dried garbage, 30 kg of lumber, and 5 kg of news papers were burned in the incinerator, while the air was being supplied from the compressor and a total volume of 4 litters of the agent for purifying flue gas were being continuously supplied.

Comparative Example 1

The same material as used in Example 1 was burned in the same incinerator as used in Example 1 by using water instead of the agent for purifying flue gas and incinerated ash.

Component analysis of flue gas sampled from the opening of the incinerator was conducted during the incineration step in Example 1 and Comparative Example 1. In this analysis, concentrations of dust, sulfur oxides, and nitrogen oxides, an amount of emission gas, and moisture content are measured in accordance with JIS Z 8808-1995, JIS K 0103-1995, JIS B 7982-1995, and JIS K 0107-1995, respectively. The results of the measurements are shown in TABLE 1.

TABLE 1

| | Dust concentration (oxygen converted value) | Concentration of sulfur oxides (K value) | Concentration of nitrogen oxides (oxygen converted value) | Amount of emission gas | Moisture content |
|---|---|---|---|---|---|
| EXAMPLE 1 | 1.4(0.85) | 1 <4(<0.08) | 43(26) | 120 | 9.20% |
| COMPARATIVE EXAMPLE 1 | 2.0(2.0) | 210(3.47) | 74(72) | 90 | 7.10% |

In Table 1, measures of dust concentration and an oxygen converted value are g/$m^3$, a measure of sulfur oxide concentration is ppm (no measure for K value), measures of nitride oxides concentration and an oxygen concerted value are ppm, and a measure of the amount of emission gas is $m^3$/h.

It is clear from Table 1 that the agent for purifying flue gas and incinerated ash according to the present invention has excellent purifying effects.

Example 2

By using the same incinerator as used in Example 1, 30 kg of lubber chips 20 centimeters square made from used tires, 30 kg of plastic, 30 kg of vinyl chloride chips, and 20 kg of dried garbage are burned in the incinerator, while the air was being supplied from the compressor and a total volume of 4 litters of the agent for purifying flue gas and incinerated ash was being continuously supplied.

Comparative Example 2

The same material as used in Example 2 was burned in the same incinerator as used in Example 2 without using the agent for purifying flue gas and incinerated ash.

Dioxins contained in flue gas, which was generated in the incineration step in Example 2 and Comparative Example 2, were analyzed. In this analysis, concentrations of dioxin and dibenzofuran and their poisonous quantities were measured in accordance with the Official Notice No. 234, "Method for calculating a concentration of dioxin", given by the Ministry of Health and Welfare on Dec. 1, 1997 and an appendix to the Official Report No. 38 "Manual for standard measurement analysis of dioxins contained in waste disposal" from Water Supply and Environmental Sanitation Department, Environmental Health Bureau, Ministry of Health and Welfare in February, 1997.

A total concentration and toxicity equivalent of dioxins are shown in Table 2.

TABLE 2

| | sample | Total concentration | Toxicity equivalent |
|---|---|---|---|
| EXAMPLE 2 | Actual value | 20000 ng/m$^3$N | 400 ng-TEQ/m$^3$N |
| | Converted value at $O^2 = 12\%$ | 20000 ng/m$^3$N at $O^2 = 12\%$ | 410 ng-TEQ/m$^3$N at $O^2 = 12\%$ |
| COMPARATIVE EXAMPLE 2 | Actual value | 660000 ng/m$^3$N | 1200 ng-TEQ/m$^3$N |
| | Converted value | 660000 ng/m$^3$N at $O^2 = 12\%$ | 9900 ng-TEQ/m$^3$N at $O^2 = 12\%$ |

It is clear from the above results that the agent for purifying flue gas and incinerated ash according to the present invention contributes to a decrease in dioxins in flue gas.

Example 3

300 g of incinerated ash generated in the incineration step in Comparative Example 2 was put in a container and 500 ml of the agent for flue gas and incinerated ash according to the present invention were sprayed to the ash in the container. After that, concentrations of dioxins and dibenzofuran contained in the incinerated ash and their poisonous quantities were measured in accordance with an appendix to the Official Report No. 38 "Manual for standard measurement analysis of dioxins contained in waste disposal" made by Water Supply and Environmental Sanitation Department, Environmental Health Bureau, Ministry of Health and Welfare in Feb., 1997.

Comparative Example 3

300 g of the incinerated ash generated in the incineration step in comparative Example 2 was analyzed.

Comparative Example 4

300 g of the incinerated ash generated in the incineration step in comparative Example 2 was burned using gas burner at the temperature of 800° C. for 5 minutes. After that, a concentration and poisonous quantities of dioxins contained in the ash were measured.

A concentration and toxicity equivalent of dioxins contained in the ash were shown in Table 3.

TABLE 3

| sample | Total concentration | Toxicity equivalent |
|---|---|---|
| COMPARATIVE EXAMPLE 3 | 340 ng/g-dry | 5.4 ng-TEQ/g-dry |
| COMPARATIVE EXAMPLE 4 | 300 ng/g-dry | 4.7 ng-TEQ/g-dry |
| EXAMPLE 3 | 4.7 ng/g-dry | 0.17 ng-TEQ/g-dry |

It is clear from the above results that the agent for purifying flue gas and incinerated ash according to the present invention contributes to a decrease in dioxins.

INDUSTRIAL APPLICABILITY

The agent for purifying flue gas and incinerated ash according to the present invention can effectively remove or decompose dusts, sulfur oxides, nitrogen oxides, hydrogen chloride, and dioxins contained in flue gas.

Further, the agent for purifying flue gas and incinerated ash according to the present invention can effectively remove or decompose dioxins contained in incinerated ash.

The agent for purifying flue gas and incinerated ash according to the present invention is excellent in workability and environmental protection and liquid wastes do not contain environmentally unfriendly substances.

What is claimed is:

1. An agent for purifying flue gas and incinerated ash comprising:
    a) one or more salts selected from the group consisting of alkali metal silicates;
    b) hydrogencarbonate ion;
    c) fluoride ion, d) less than about 20% by weight water-soluble alcohols or derivatives thereof, and water or water soluble solvents.

2. The agent according to claim with 1, wherein the one or more kinds of salts selected from the the group consisting of alkali metal silicates is sodium silicate.

3. The agent according to claim 1, wherein the water-soluble alcohols or derivatives thereof are ethylene glycol.

4. A method for purifying flue gas comprising a step of spraying the agent according to claim 1 to flue gas.

5. A method for purifying incinerated ash comprising a step of spraying the agent according to claim 1 to incinerated ash.

6. An agent for purifying flue gas and incinerated ash comprising at least 20% by weight water or a water soluble solvent, and salts of alkali metal silicate; fluoride ion; hydrogen-carbonate ion; and water-soluble alcohols or derivatives thereof.

7. An agent for purifying flue gas and incinerated ash comprising at least about 0.1% to 23% by weight of one or more salts selected from the group consisting of alkali metal silicates; about 0.1% to 25% fluoride ion; $1 \times 10^{-3}\%$ to 10% hydrogen-carbonate ion; 1% to 20% by weight water-soluble alcohols or derivatives thereof, and water.

* * * * *